US012515840B2

(12) United States Patent
Finnsson et al.

(10) Patent No.: US 12,515,840 B2
(45) Date of Patent: Jan. 6, 2026

(54) METHOD AND AN APPARATUS FOR FILLING CONTAINERS WITH FOOD ITEMS

(71) Applicant: MAREL ICELAND EHF., Gardabaer (IS)

(72) Inventors: Thorir Finnsson, Kopavogur (IS); Hordur Gardarsson, Akranes (IS)

(73) Assignee: MAREL ICELAND EHF, Gardabaer (IS)

( * ) Notice: Subject to any disclaimer, the term of this patent is extended or adjusted under 35 U.S.C. 154(b) by 169 days.

(21) Appl. No.: 17/639,440

(22) PCT Filed: Sep. 7, 2020

(86) PCT No.: PCT/EP2020/074933
§ 371 (c)(1),
(2) Date: Mar. 1, 2022

(87) PCT Pub. No.: WO2021/044053
PCT Pub. Date: Mar. 11, 2021

(65) Prior Publication Data
US 2022/0289416 A1    Sep. 15, 2022

(30) Foreign Application Priority Data

Sep. 6, 2019    (EP) ..................... 19196001
Oct. 30, 2019   (DK) .......................... PA 2019 70674

(51) Int. Cl.
B65B 5/10      (2006.01)
B65B 35/16     (2006.01)
(Continued)

(52) U.S. Cl.
CPC ............ B65B 59/003 (2019.05); B65B 5/105 (2013.01); B65B 35/16 (2013.01); B65B 43/46 (2013.01);
(Continued)

(58) Field of Classification Search
CPC ....... B65B 43/46; B65B 43/52; B65B 59/003; B65G 47/90
(Continued)

(56) References Cited

U.S. PATENT DOCUMENTS 1,885,829 A    11/1932    Hunt
1,889,919 A    12/1932    Hunt
(Continued)

FOREIGN PATENT DOCUMENTS

CN    105083624 A    11/2015
CN    106516230 A    3/2017
(Continued)

OTHER PUBLICATIONS

Office Action from Chinese Application No. 202080061021.8, Jan. 20, 2023.
(Continued)

Primary Examiner — Thanh K Truong
Assistant Examiner — Patrick B Fry
(74) Attorney, Agent, or Firm — Workman Nydegger

(57) ABSTRACT

A system is provided for placing food items into containers such that the containers fulfil at least one criterion. The system has handling devices arranged along a conveyor belt of a conveyor system and a control unit connected to a position tracker for controlling the handling devices using position data from the position tracker.

14 Claims, 13 Drawing Sheets

(51) Int. Cl.
  *B65B 43/46* (2006.01)
  *B65B 43/52* (2006.01)
  *B65B 53/02* (2006.01)
  *B65B 57/02* (2006.01)
  *B65B 59/00* (2006.01)
  *B65G 43/08* (2006.01)
  *B65G 47/90* (2006.01)

(52) U.S. Cl.
  CPC ............ *B65B 43/52* (2013.01); *B65B 57/02* (2013.01); *B65G 43/08* (2013.01); *B65G 47/90* (2013.01); *B65G 2203/0233* (2013.01)

(58) Field of Classification Search
  USPC .................................................. 53/168, 251
  See application file for complete search history.

(56) References Cited

U.S. PATENT DOCUMENTS

| | | | |
|---|---|---|---|
| 3,303,526 A | 2/1967 | La Pine et al. | |
| 4,365,387 A | 12/1982 | Hartmann et al. | |
| 4,761,856 A | 8/1988 | Ewing | |
| 4,827,571 A | 5/1989 | Ewing et al. | |
| 4,882,811 A | 11/1989 | Ewing | |
| 6,122,895 A * | 9/2000 | Schubert | B25J 9/026 |
| | | | 53/251 |
| 6,200,211 B1 | 3/2001 | Braeger et al. | |
| 6,280,313 B1 | 8/2001 | Braeger et al. | |
| 6,579,053 B1 * | 6/2003 | Grams | B65G 47/90 |
| | | | 414/268 |
| 7,240,465 B2 * | 7/2007 | Davi' | G05B 19/4182 |
| | | | 53/244 |
| 7,644,558 B1 * | 1/2010 | Fallas | B65G 47/914 |
| | | | 53/251 |
| 7,775,373 B2 * | 8/2010 | Grundtvig | B65B 5/105 |
| | | | 414/800 |
| 10,351,280 B2 | 7/2019 | Prahm et al. | |
| 10,384,872 B2 | 8/2019 | Wicks et al. | |
| 10,661,992 B2 | 5/2020 | Wicks et al. | |
| 11,273,944 B2 * | 3/2022 | Pickett | B65B 5/105 |
| 2004/0253915 A1 | 12/2004 | Braeger et al. | |
| 2009/0026119 A1 | 1/2009 | Helgi | |
| 2013/0299307 A1 * | 11/2013 | Thorsson | B65G 47/46 |
| | | | 198/346.2 |
| 2014/0037416 A1 | 2/2014 | Klein et al. | |
| 2014/0123606 A1 * | 5/2014 | Ehrat | B65B 5/12 |
| | | | 53/473 |
| 2016/0083129 A1 | 3/2016 | Prahm et al. | |
| 2017/0203861 A1 * | 7/2017 | Van Halsema | B65B 43/52 |
| 2018/0057264 A1 | 3/2018 | Wicks et al. | |
| 2019/0329979 A1 | 10/2019 | Wicks et al. | |
| 2021/0061506 A1 * | 3/2021 | Pickett | B65B 5/105 |

FOREIGN PATENT DOCUMENTS

| | | | | |
|---|---|---|---|---|
| CN | 108455272 A | 8/2018 | | |
| CN | 108750687 A | 11/2018 | | |
| CN | 109279097 A | 1/2019 | | |
| CN | 109689535 A | 4/2019 | | |
| DE | 102013105002 A1 | 11/2014 | | |
| EP | 0774303 A2 * | 5/1997 | ............. | B07C 3/08 |
| EP | 0856465 A1 | 8/1998 | | |
| EP | 1916191 A1 | 4/2008 | | |
| EP | 2457851 A1 * | 5/2012 | ........... | B65G 1/1378 |
| EP | 2637509 B1 | 5/2015 | | |
| EP | 2936989 A2 | 10/2015 | | |
| EP | 3053860 A1 | 8/2016 | | |
| GB | 466674 A | 6/1937 | | |
| JP | H0687334 U | 12/1994 | | |
| JP | H10218104 A | 8/1998 | | |
| JP | 2014221650 A | 11/2014 | | |
| JP | 201795282 A | 6/2017 | | |
| KR | 20120107893 A | 10/2012 | | |
| WO | 0112348 A1 | 2/2001 | | |
| WO | 2012055411 A1 | 5/2012 | | |

OTHER PUBLICATIONS

Search Report from Chinese Application No. 202080061021.8, Jan. 12, 2023.

International Search Report with Written Opinion from PCT Application No. PCT/EP2020/074933, Dec. 11, 2020.

Extended Search Report from corresponding EP Application No. 19196001.2, Dec. 17, 2019.

Danish Examination and Search Report from corresponding Application No. PA 201970674, Mar. 5, 2020.

Japanese Office Action from Corresponding Japanese Patent Application No. JP2022-513355, Apr. 23, 2024.

* cited by examiner

METHOD AND AN APPARATUS FOR FILLING CONTAINERS WITH FOOD ITEMS

FIELD OF THE INVENTION

The present invention relates to a system and a method for placing multiple food items into containers to fulfil different criteria on item properties in each container.

BACKGROUND OF THE INVENTION

Known systems and methods for placing food items into containers all share one perceived drawback: a container entering the system first also leaves the system first, the so called First In First Out principle or FIFO. This introduces limitations in flexibility, the progress of available food items and their properties dictate how the containers may be filled at any certain time period. For example, if there are no suitable combinations of items available to reach a certain total target weight in one container and in the time slot from the time a container enters the system, until it leaves the system, it might be necessary to compromise on the target weight in at least one container. When e.g. this container is the last container in the sequence of containers, it will have to be filled to an overweight status or, worse, and underweight status, otherwise it will block the upstream containers and thus seriously affect the throughput of the system.

Neither of these options is acceptable. Furthermore, the sequence of containers is set once the containers enter the system. If there are different size containers used, the flexibility to fill larger containers with larger items, for example, is also dictated by the progress of available food items and their properties at the allotted time period for filling.

There exists a need for a system and method for placing food items into containers that is more flexible.

SUMMARY OF THE INVENTION

On the above background it is an object of embodiments of the present invention to provide a system and method for placing food items into containers which system is more flexible and which presents a larger selection of food items for filling a specific container to a certain desired status, and at the same time provides a high capacity for the system and method.

In general, the invention preferably seeks to mitigate, alleviate or eliminate one or more of the above-mentioned disadvantages of the prior art singly or in any combination. In particular, it may be seen as an object of embodiments of the present invention to provide a system and method for placing food items into containers that solves the above-mentioned problems, or other problems.

To better address one or more of these concerns, in a first aspect of the invention a system for placing multiple food items into containers by a food processing system such that the containers fulfil at least one criterion, comprising:
 a food processing system
 a conveyor system comprising a conveyor belt arranged to transport containers from a container input on the conveyor belt to a container output on the conveyor belt,
 at least two handling devices arranged along the conveyor system at a first and at least one second location,
 a position tracker for obtaining position data indicative of at least partly tracking positions of containers resting on the conveyor belt while being conveyed by the conveyor system, and
 a control unit connected to the position tracker for controlling the at least two handling devices using position data from the position tracker, the controlling including:
 instructing an available handling device selected from the at least two handling devices to temporarily move a selected container from the conveyor system and move the container to a food processing position where the container is retained while the food processing system places food items into the container, the food processing position being selected such that it allows remaining containers resting on the conveyor belt to be conveyed by the conveyor system past the first and the at least one second position,
 identifying, after the at least one criterion is fulfilled, available free space on the conveyor belt for the selected container, and
 instructing the handling device to place the selected container into the available space on the conveyor belt.

The multiple food items may be conveyed by an infeed conveyor comprising item conveyor belt where the food items are resting on the item conveyor belt. As an example, the food items may be fed onto the item conveyor belt at an infeed position upstream in relation to the first and at least one second location, by e.g. feeding the items preferably such that the food items are in a none intermingled way. Another example is where the infeed position is coupled to a cutting apparatus that cuts incoming food object into multiple food items.

The food items may e.g. be meat, fish, poultry or similar products, and the food items may particularly derive from larger pieces being cut into smaller pieces, e.g. in a filleting process. In case the food items are fish fillets, the smaller pieces may be selected from one or more of: one or more belly pieces, one or more loin pieces, and/or one or more tail pieces. Such different types of smaller pieces may also contribute to the different criteria, i.e. one batch may e.g. only contain belly pieces, and e.g. another batch contains only loin pieces, etc., or the criterion may also include a mix of such types. This should of course not be construed as being limited to fish, this could just as well apply for poultry where one type is drumsticks, another type is poultry wings, and yet another type is chicken breasts.

The at least two handling devices may be arranged to grab at least two sides of the selected containers, which typically have a height, a width and a length, and at least partly move the selected container upwards from the conveyor belt, where the food processing position is at a height position exceeding the height of the containers so as to allow remaining containers on the conveyor system to be conveyed under the selected and retained container while the food processing system places multiple food items into the selected and retained container.

This allows simultaneous operation of the conveyor system and the food processing system such that containers can be moved under the selected container while the selected container is in the food processing position, and simultaneous with the moving of the containers on the conveyor system, food items may be arranged in the selected container in the food processing position. Moreover, this results in less floor space.

Each of the at least two handling devices may have opposingly arranged gripper devices arranged across the conveyor system. The height level of the item conveyor belt on which the food items are resting is in one embodiment higher than the height level of conveyor belt on which the containers are resting. This will thus shorten or minimize the distance from where the food items are e.g. picked up and the processing position of the containers.

Alternatively, or in combination, the at least two handling devices may be arranged to move the selected container sideways from the conveyor belt, where the food processing position is at a sideways position exceeding the width of the containers so as to allow remaining containers on the conveyor system to be conveyed next to the selected and retained container while the food processing system places multiple food items into the selected and retained container. Each of the at least two handling devices may comprise opposingly arranged gripper devices arranged to reciprocally grip and slide the selected container sideways from the conveyor belt. The height level of the item conveyor belt on which the food items are resting is in one embodiment the same as the height level of the conveyor belt on which the containers are resting. This will thus shorten or minimize the distance from where the food items are e.g. picked up and the processing position of the containers.

In a further alternative, or in combination, the at least two handling devices may be arranged to grip and move the selected container sideways and upwards from the conveyor belt, where the food processing position is at a sideways and elevated position exceeding the width and the height of the containers so as to allow remaining containers on the conveyor system to be conveyed next to and below the selected and retained container while the food processing system places multiple food items into the selected and retained container. Each of the at least two handling devices may have opposingly arranged gripper devices arranged to reciprocally grip and lift and slide the selected container sideways and upwards from the conveyor belt.

In yet a further alternative, or in combination, the at least two handling devices may be arranged to grab a bottom side of the selected containers and at least partly move the selected container upwards from the conveyor belt, where the food processing position is at a height position exceeding the height of the containers so as to allow remaining containers on the conveyor system to be conveyed under the selected and retained container while the food processing system places multiple food items into the selected and retained container.

The food processing system further may have at least one robotic picker arm arranged to move items from at least one item transport conveyor to the selected and retained container.

The conveyor system may have at least two conveyor belts for containers, running in the same direction or opposite directions to a food item transport direction. In one embodiment, the conveyor system comprises two conveyor belts placed opposite to the food item conveyor that conveys the food items. The two conveyor belts for the containers may be running in the same direction, or in opposite directions. In the embodiment where the conveyor system may have at least two conveyor belts, the food processing system may be adjusted accordingly to cope with the increase of food items, e.g. by having two or more robotic picker arms.

The term "container" may e.g. cover boxes or trays of different size or shape. The containers may have lengths chosen from one modular length, two modular lengths and three modular lengths etc., the length being measured in the container transport direction. In this manner, one or more handling devices may interact with one container depending upon if the container length is one, two, three or more modular lengths. Thus, the one modular length container may be arranged to cooperate with one handling device, the two modular length container may be arranged to cooperate with two handling devices simultaneously and the three modular length container may be arranged to cooperate with three handling devices simultaneously, etc. In one embodiment, the containers are rectangular and have fixed width and either fixed lengths or different lengths (e.g. boxtype 1: width1=30 cm, length1=50 cm; boxtype 2: width2=30 cm, length2=100 cm), where the position of the containers is such that a longitudinal axis of the length is parallel to the conveying direction of the containers.

The at least two gripper devices may be attached to a movable arm, the movable arm being selectively movable between a first position and a second position. The first position is a passive position where the opposingly arranged gripper devices are in a passive position without contact with a selected container on the conveyor belt, and the second position being an active position where the opposingly arranged gripper devices have engaged with the container and moved it to the food processing position. The movable arm may be pivotable about a rotation axis, for example using a rotating drive or a linear actuator, or the movable arm may be reciprocally linearly movable between the first and second positions, for example using a linear actuator.

The at least one robotic picker arm may pick food items from at least one food item conveyor, each food item conveyor may be travelling in the same direction as an adjacent container conveyor belt or in an opposite direction.

The food items may be scanned using a scanning device to determine at least one food item property selected from the food item position on the food item conveyor, food item dimensions, colour, surface topography and/or weight and combinations thereof. Also, a scale such as a flow scale may be implemented to weigh the food items as they are being conveyed. Another alternative is where the food items originate from a portion cutter device where e.g. the food items have originated from a food object that is cut into smaller pieces, i.e. food items, where the weight is known.

The scanning device may be a scanner using electromagnetic waves, any type of weigh scale (e.g. the flow scale), and combinations thereof.

Accordingly, a system is provided that is based on First In First Out principle (FIFO) meaning that the throughput of the system is greatly increased, since those containers that are in the food processing position do not block the remaining containers resting on the conveyor belt of the conveyor system, but these containers (resting on the conveyor belt of the conveyor system) may e.g. be containers that have been filled up to the at least one target, and/or empty containers, and/or containers partially filled with food items.

Another advantage of the system according to the present invention is the flexibility, where multiple criterion may be achieved simultaneously. As an example, containers having the same and/or different geometrical shapes/volumes may have different criterion, e.g. different weight target. This means that one container in food processing position may be assigned to one (or more) criterion including e.g. 4 kg weight target, whereas another identical container may have another criterion, e.g. 5 kg target. In one embodiment, one container in the food processing position is assigned to more than one criterion, e.g. related to weight and colour, or weight and number of food items in the container etc.

Also, as discussed previously, the containers may have modular lengths, e.g. 20 cm, 30 cm and 40 cm, that may be suitable for receiving different types of food items (e.g. three modular size for whole fish), or fish pieces (e.g. one modular size), where e.g. different criterion may be based on different customer orders. Some customers may e.g. be a restaurant asking for 300 g cod fillets, whereas another customer can be a supermarket asking for 200 g cod fillets. Thus, the flexibility of the system is greatly enhanced.

As will be discussed below, the term criterion may also be understood as a target, and where the system according to the present invention may be considered as a batching system (e.g. making batches in the containers of fixed target weight), or a grading system (e.g. food items having specific characteristics, e.g. x number of pieces having similar colors or e.g. similar sizes), or a combination of both.

Due to the nature of food, i.e. the food items may have different size, colour, shape, or other characteristics which are to fulfil the criterion, the time it takes to fulfill the criterion may vary between each container. Accordingly, the control unit may particularly be configured to allow each container to remain in the food processing position in a time period which is individual for each container. I.e. one container may remain in the food processing position for e.g. 10 minutes and another may remain in the food processing position for several hours etc. That allows each container to have an individual time slot at the food processing position that is needed. In one embodiment, the control unit allocates a time slot to each container in the food processing position.

In one embodiment, the system is configured to retain two or more containers in the food processing position and to place food items into the at least two containers simultaneously.

The simultaneous filling of at least two containers may be based on individual criterion for each container, i.e. processing of two or more containers with different criterion and simultaneously.

In one embodiment, the at least two handling devices arranged along the conveyor system at a first and at least one second location are configured to operate at least partly simultaneously such that the time period where the containers selected by the at least two handling devices are retained in the food processing position at least partly overlaps. In this embodiment, the steps of identifying, after the at least one criterion is fulfilled, available free space on the conveyor belt for the selected container, and the step of instructing the handling device to place the selected container into the available space on the conveyor belt, may take place for the at least two containers by use of individual handling devices, simultaneously or consecutively.

The food processing system may include one or more processing stations positioned upstream the location where the food processing system places the food items into the containers. Such processing stations may include manual or automatic cutting, de-heading, deboning, filleting, or gutting stations or combinations thereof.

In one embodiment, the food processing system comprises a plurality of robotic picker arms. Such robotic picker arms may be arranged in processing cells e.g. capable of handling 2, 4, 6, 8 or more containers in each cell. In one embodiment, each cell comprises a plurality of food processing positions for a plurality of containers, and each cell is flexibly aligned such that a large number of small containers or a smaller number of larger containers can be received, e.g. 8 small or 4 large, or 6 small and 1 large etc. In such a modular system, the same cell may process containers with completely different criterion simultaneously.

The at least two handling devices may be configured for moving the selected container from the conveyor system to the food processing position while the other containers on the conveyor system are moving.

The at least two handling devices may be configured for moving the selected container from the conveyor system to the food processing position while the selected container is moving on the conveyor system.

In a second aspect of the invention a method for operating a system for placing multiple food items into containers by a food processing system such that the containers fulfil at least one criterion, has the steps of:
    transporting containers using a conveyor system comprising a conveyor belt arranged to transport containers from a container input on the conveyor belt to a container output on the conveyor belt, the containers having a height, a width and a length,
    obtaining position data indicative of at least partly tracking positions of containers resting on the conveyor belt while being conveyed by the conveyor system using a position tracker, and
    controlling the system using a control unit connected to the position tracker for controlling the at least two handling devices using position data from the position tracker, the controlling including:
    instructing an available handling device selected from the at least two handling devices to temporarily move a selected container from the conveyor system and move the container to a food processing position where the container is retained while the food processing system places at least one food item into the container, the food processing position being selected such that it allows remaining containers resting on the conveyor belt to be conveyed by the conveyor system past the first and the at least one second position,
    identifying, after the at least one criterion is fulfilled, available free space on the conveyor belt for the selected container, and
    instructing the handling device to place the selected container into the available space on the conveyor belt.

The at least one criterion comprises, a weight target, a number target, a geometrical or volume target, a color target, a number of species target, a combination of one or more of the above. The at least one criterion should however not be construed as being limited to this.

In an embodiment, the step of at least partly tracking positions of containers resting on the conveyor belt while being conveyed by the conveyor system using a position tracker further comprises tracking the containers after the at least one criterion has been reached and the containers have been placed into the available space on the conveyor belt. In that way, different orders from different customers may be accumulated together, i.e. order 1 goes to a specific place (e.g. a specific pallet) where order 2 (order n) goes to another place (e.g. another pallet).

The containers may have two or more different geometrical shapes/volumes, meaning that different orders of e.g. different target weight, and/or different sizes (or any other criterion) may be handled simultaneously.

The different at least one criterion may in one embodiment be assigned to two or more different containers such that one or more of the following applies:
    containers of same geometrical shapes/volumes have different at least one criterion,
    containers of different geometrical shapes/volumes have different at least one criterion
    wherein the step of at least partly tracking positions of containers resting on the conveyor belt while being conveyed by the conveyor system using a position tracker further comprises tracking the two or more different containers after the different at least one criterion has been reached and the containers have been placed into the available space on the conveyor belt.

The step of moving the container by the at least two handling devices may be performed by grabbing at least two sides of the selected containers and at least partly moving the selected container upwards from the conveyor belt, where the food processing position is at a height position exceeding the height of the containers so as to allow remaining containers on the conveyor system to be conveyed under the selected and retained container while the food processing system places multiple food items into the selected and retained container.

To this end, each of the at least two handling devices may have opposingly arranged gripper devices arranged across the conveyor system.

The step of moving the container by the at least two handling devices may be performed by moving or pushing the selected container sideways from the conveyor belt, where the food processing position is at a sideways position exceeding the width of the containers so as to allow remaining containers on the conveyor system to be conveyed next to the selected and retained container while the food processing system places multiple food items into the selected and retained container.

Each of the at least two handling devices may have opposingly arranged gripper devices arranged to reciprocally grip and slide the selected container sideways from the conveyor belt.

The step of moving the container by the at least two handling devices may alternatively, or in combination, be performed by gripping and pushing the selected container sideways and upwards from the conveyor belt, where the food processing position is at a sideways and elevated position exceeding the width and the height of the containers so as to allow remaining containers on the conveyor system to be conveyed next to and below the selected and retained container while the food processing system places multiple food items into the selected and retained container.

Each of the at least two handling devices may have opposingly arranged gripper devices arranged to reciprocally grip and lift and slide the selected container sideways and upwards from the conveyor belt.

Further, alternatively or in combination, the step of moving the container by the at least two handling devices may be performed by grabbing a bottom side of the selected containers and at least partly moving the selected container upwards from the conveyor belt, where the food processing position is at a height position exceeding the height of the containers so as to allow remaining containers on the conveyor system to be conveyed under the selected and retained container while the food processing system places multiple food items into the selected and retained container.

The method may further have the step of moving food items using at least one robotic picker arm of the food processing system, the arm being arranged to move items from at least one item transport conveyor to the selected and retained container.

The conveyor system may have at least two conveyor belts for containers.

The containers may have lengths chosen from one modular length, two modular lengths and three modular lengths, etc. In this case, the one modular length container may be arranged to cooperate with one handling device, the two modular length container may be arranged to cooperate with two handling devices simultaneously and the three modular length container may be arranged to cooperate with three handling devices simultaneously, etc.

The step of moving a selected container by the at least two handling devices may be performed by each of the at least two handling devices being attached to a movable arm, the movable arm being selectively movable between a first position and a second position, wherein in the first position a selected container rests on the conveyor belt and in the second position the selected container is removed off the conveyor belt such that containers on the conveyor belt are freely transportable on the conveyor belt. The movable arm may be pivotable about a rotation axis, for example using a rotating drive or a linear actuator, or alternatively, the movable arm may be reciprocally linearly movable between the first and second positions, for example using a linear actuator.

The at least one robotic picker arm may pick food items from at least one item conveyor.

The method further may have the step of scanning the food items using a scanning device to determine at least one food item property selected from the group consisting of position on the at least one item conveyor, dimensions, colour, surface topography, weight and combinations thereof. The scanning device may be selected from the group consisting of at least one of a scanner using electromagnetic waves, a weigh scale, and combinations thereof.

The method according to the present invention may also be understood as a grading method and/or a batching method. The term grading may e.g. include steps of sorting food items into containers (based of certain criterion, e.g. size, shape, quality, color). The term batching may include making batches in the containers having pre-defined target weight. Different target weights may be assigned to different containers, e.g. containers having same sizes/shapes (e.g. modular size x), or containers having different sizes/shapes (e.g. modular size y, where x≠y).

Accordingly, a method is provided that enhances the throughput of the system because no blocking occurs with a container where the target has not been reached since it will be positioned in the food processing position. Also, multiple criterion may be processed at the same time, e.g. different weight targets, different sorting criterion etc.

Thus, a system and method according to the invention brings the advantage of enabling the system to freely choose how long a specific container remains in the food processing position, without hindering the flow of other containers on the container conveyor(s). Further, an arbitrary mix of different containers may be processed by the system without changes to mechanical devices. The control unit (e.g. any type of computer device comprising a processor and memory) may be programmed on-the-fly (dynamically) taking into account the scan of actual items entering the system to create bespoke batches in each individual container. For example, and as mentioned above, containers of the same size may be filled to different item weights, or composition of items. Further to tracking container positions on the container conveyor, the position tracker and control system also stores information defining positions of handling devices. Thus, a passive position handling device is ready to receive a container and an active position handling device holds a container to be filled. That container which is held by a handling device is also tracked by the control system to indicate fill grade, i.e. empty, partly filled or full according to the desired criteria.

The system and method according to the invention provides a higher total throughput due to no or minimized queuing of containers and flexible item batching in same size or different size containers.

BRIEF DESCRIPTION OF THE DRAWINGS

Embodiments of the invention will be described, by way of example only, with reference to the drawings, in which.

DESCRIPTION OF EMBODIMENTS

Figure 1A:
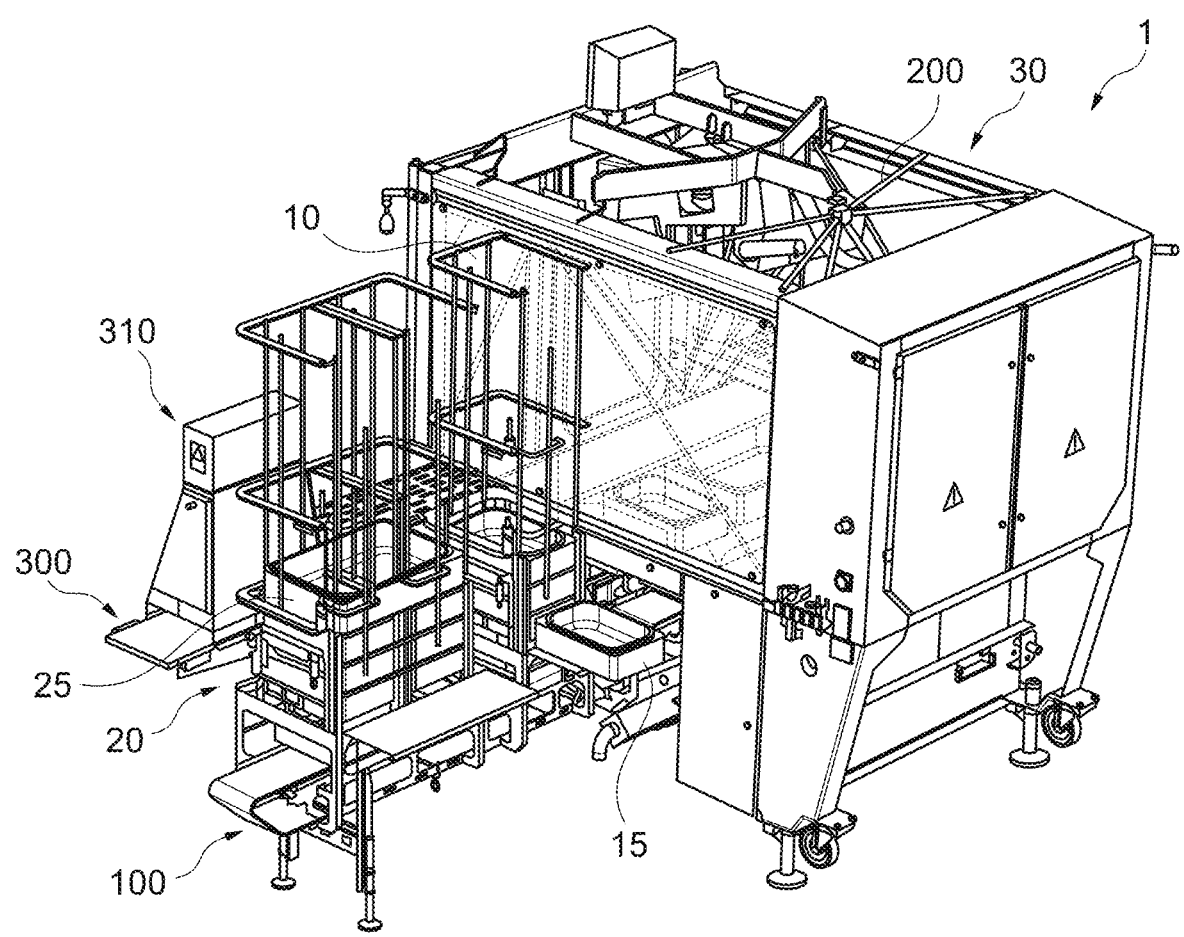
FIG. 1A is an elevated schematic perspective view of a system according to an embodiment of the invention, having one robotic picker arm, one container conveyor belt and one item conveyor belt.

FIG. 1A shows an embodiment of a system 1 according to the invention. A first container input 10 for a first type of container 15 and a second container input 20 for a second type of container 25 supplies containers 15, 25 of the desired type to a conveyor system comprising a conveyor belt 100, which here below will be referred to as a container conveyor belt 100. The containers 15, 25 have a height, a width and a length, and may be square, rectangular or round, for instance.

The containers 15, 25 are transported by the container conveyor belt 100 from the container input 10, 20 towards a food processing system, which in this embodiment comprises at least one robot picking arm 200 arranged on a frame 30, where food items are put into the containers until at least one criterion is obtained, where the containers are subsequently conveyed to a container output 50 (shown in FIG. 1B). This will be discussed in more details here below.

Food items 40 (see FIG. 2C etc.) are resting on a food item conveyor belt 300, and are e.g. scanned by a scanning device 310, for example an electromagnetic wave scanner, that detects and stores the positions, and/or dimensions and/or colour of the food items. The scanning data is processed to calculate locations and positions of the food items on the food item conveyor belt as well as estimating item weight and quality.

Figure 1B:
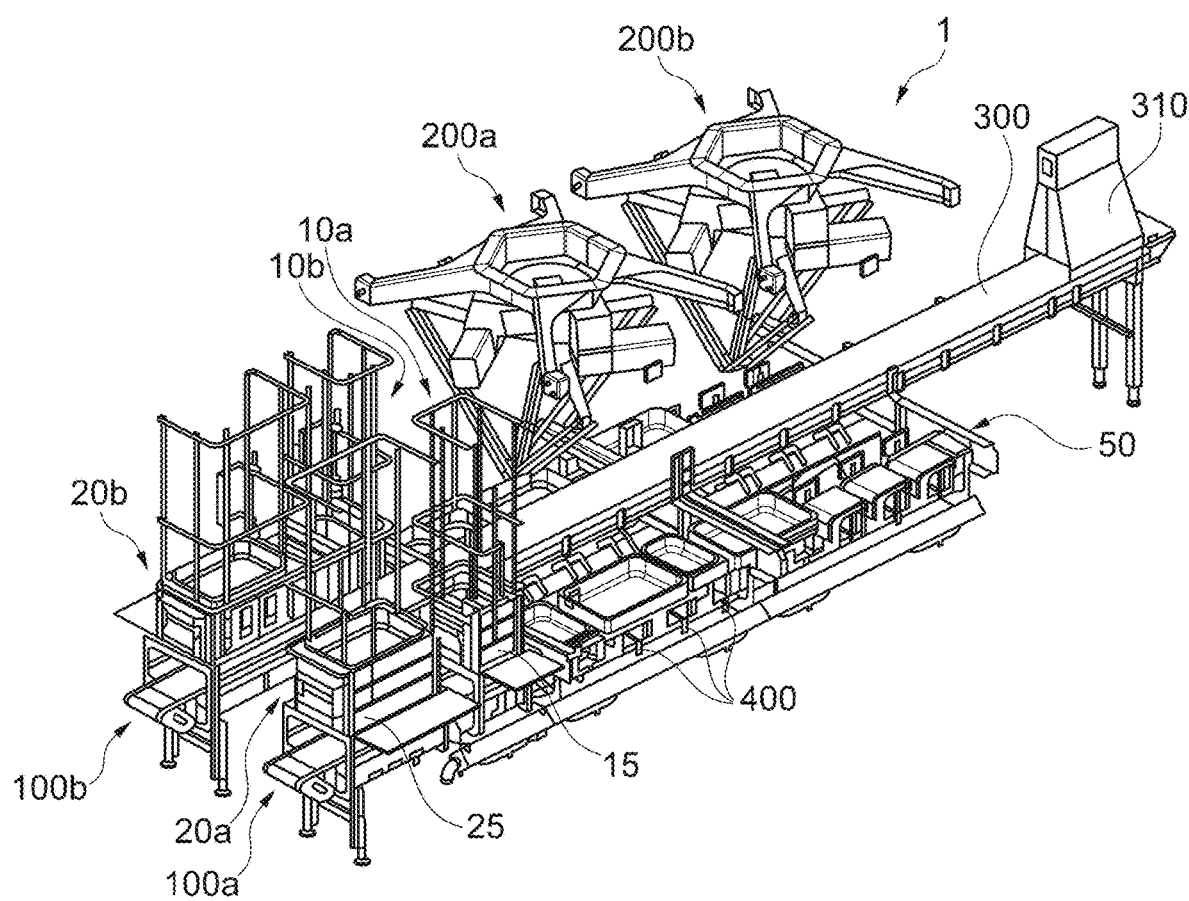
FIG. 1B is an elevated schematic perspective view of a system according to FIG. 1, having two robotic picker arms, two container conveyor belts and one item conveyor belt.
Figure 1C:
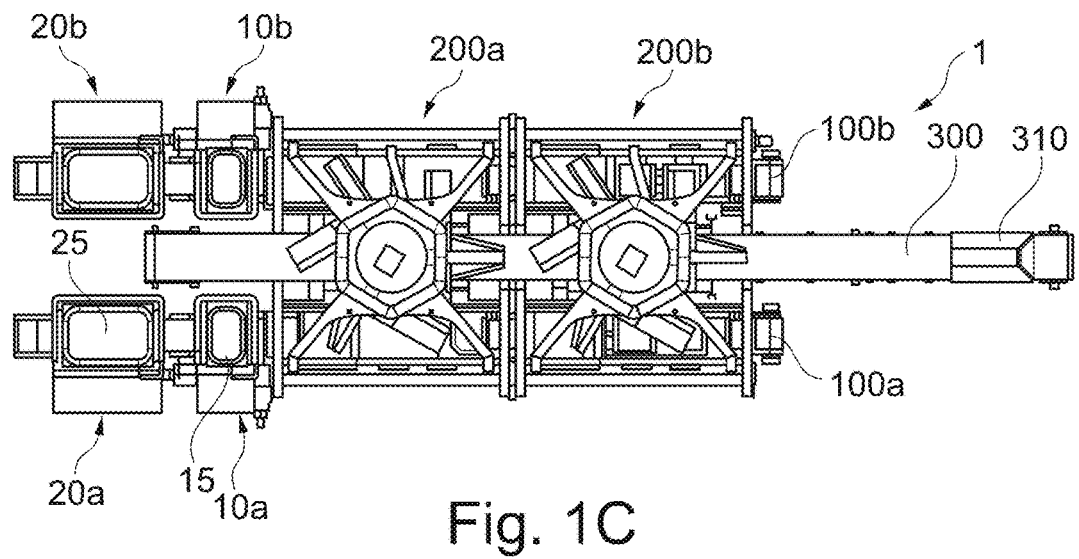
FIG. 1C is a schematic top view of the system of FIG. 1B.
Figure 1D:
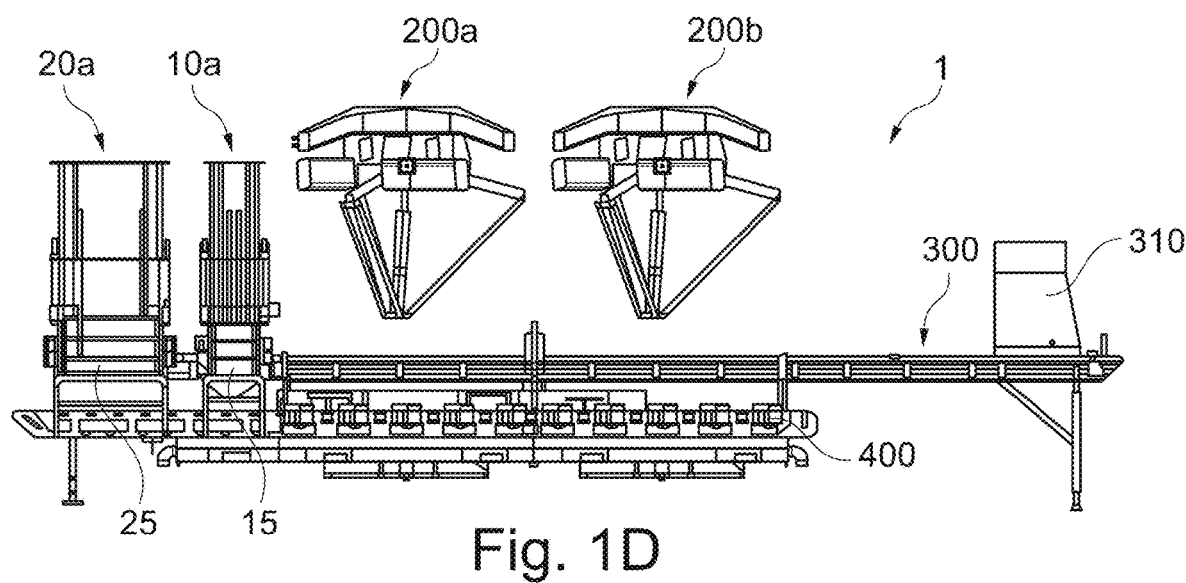
FIG. 1D is a schematic side view of the system of FIG. 1B.

FIGS. 1B to 1D show a further embodiment of the invention, where the food system 1 comprises a first container conveyor belt 100a and a second container conveyor belt 100b. The containers for the first container conveyor belt 100a are supplied by a first container input 10a for the first type of container 15 and a second container input 20a for the second type of container 25. The containers for the second container conveyor belt 100b are supplied by a third container input 10b for the first type of container 15 and a fourth container input 20b for the second type of container 25.

Along and adjacent each container conveyor belt 100a, 100b are arranged at least two handling devices 400 at a first and at least one second location.

FIGS. 2A to 3H show details of the embodiment shown in FIGS. 1A to 1D but with only one robotic arm 200. Food items 40 are transported on the food item conveyor belt 300. In such an embodiment, a single robot picking arm 200 may be sufficient to maintain maximum throughput, otherwise one or more additional robotic arms may be implemented as shown in FIG. 1.

At each handling device 400 the container conveyor 100a, 100b has a loop 110, e.g. a bypass loop created via an idle roller (not shown, placed below the upper surface of the conveyor belt), for creating a free space for a cross-bar 415 of the handling device. The cross-bar is attached to grippers 430 arranged at each end of the cross-bar. The handling device 400 is movable between a lowered position, in which the cross-bar 415 is lowered into the free space of the loop 110, and a raised position (see further description below), i.e. the food processing position.

A position tracker (not shown) obtains position data indicative of at least partly tracking the positions of containers 15, 25 resting on the container conveyor belt 100, 100a, 100b. This may e.g. be done via a vision system that is capable of keeping track of the containers, or one or more sensors arranged along the conveyor belt, or e.g. via utilizing the speed of the conveyor belt by tracking the position of the containers. Different solutions for such tracking exist that are well known to a person skilled in the art.

A control unit (not shown) is connected to the position tracker for controlling the at least two handling devices 400 using position data from the position tracker. The control unit instructs an available handling device selected from the at least two handling devices 400 to temporarily move a selected container 15, 25 from the lowered position on the container conveyor system 100, 100a, 100b and move the container to the raised position at a food processing position 410 where the container 15, 25 is retained while the food processing system, i.e. the robotic arm shown here with number 200, places food items 40 into the container. The food processing position 410 is selected such that it allows remaining containers 15, 25 resting on the container conveyor belt 100, 100a, 100b to be conveyed by the conveyor system past the first and the at least one second position. Further, the control unit identifies available free space on the container conveyor belt for the selected container, after the at least one criterion is fulfilled, e.g. a target weight. Then, the control unit instructs the handling device 400 to place the selected container 15, 25 into the available space on the container conveyor belt.

In one embodiment, the at least two handling devices 400 are arranged to grab at least two sides of the selected containers 15, 25 and at least partly move the selected container upwards from the container conveyor belt 100, 100a, 100b to the food processing position, where the food processing position 410 is at a height position exceeding the height of the containers so as to allow remaining containers on the container conveyor belt to be conveyed under the selected and retained container while the robotic arm 200 places multiple food items into the selected and retained container.

Each of the at least one handling devices 400 comprises opposingly arranged gripper devices 430 arranged across the container conveyor belt.

Alternatively (not shown), the at least two handling devices 400 are arranged to move the selected container 15, 25 sideways from the container conveyor belt 100, 100a, 100b. Thus, the food processing position 410 is at a sideways position exceeding the width of the containers so as to allow remaining containers on the container conveyor to be conveyed past the selected and retained container while the food processing system 200 places multiple food items 40 into the selected and retained container. The at least two handling devices comprise opposingly arranged gripper devices 430 arranged to reciprocally grip and slide the selected container sideways from the conveyor belt.

Further and alternatively (not shown), the at least two handling devices 400 are arranged to grip and move the selected container 15, 25 sideways and upwards from the container conveyor belt 100, 100a, 100b. The food processing position 410 is at a sideways and elevated position exceeding the width and/or the height of the containers so as to allow remaining containers on the container conveyor belt 100, 100a, 100b, to be conveyed past and below the selected and retained container while the robotic arm 200 places multiple food items 40 into the selected and retained container.

The opposingly arranged gripper devices 430 may in one embodiment be arranged to reciprocally grip and lift and move the selected container sideways and upwards from the conveyor belt.

In a further embodiment (not shown), the at least two handling devices 400 are arranged to grab a bottom side of the selected containers 15, 25 and at least partly move the selected container upwards from the container conveyor belt 100, 100a, 100b. The food processing position 410 is at a height position exceeding the height of the containers so as to allow remaining containers on the container conveyor belt to be conveyed under the selected and retained container while the food processing system 200 places multiple food items 40 into the selected and retained container.

Figure 2A:
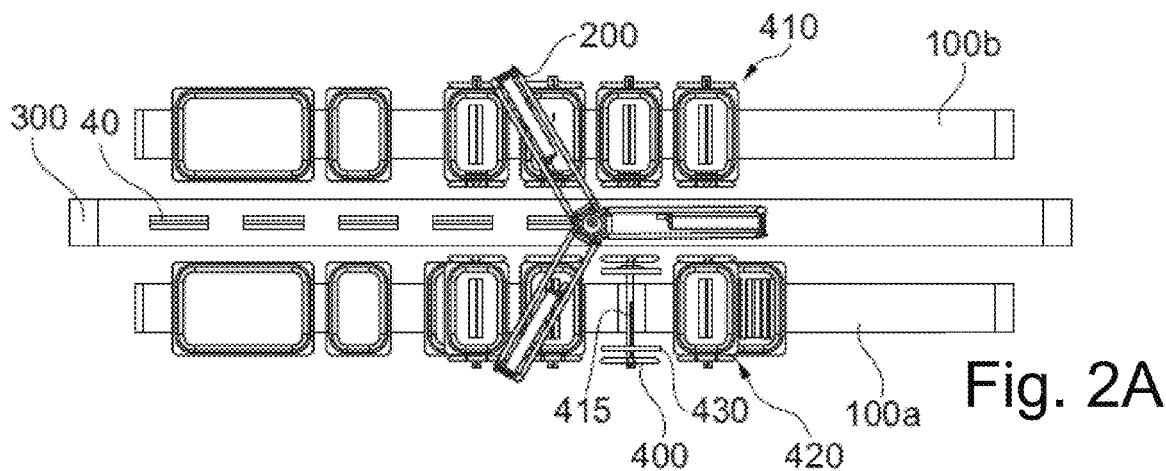
FIG. 2A is a schematic top view of the system of FIG. 2C.
Figure 2B:
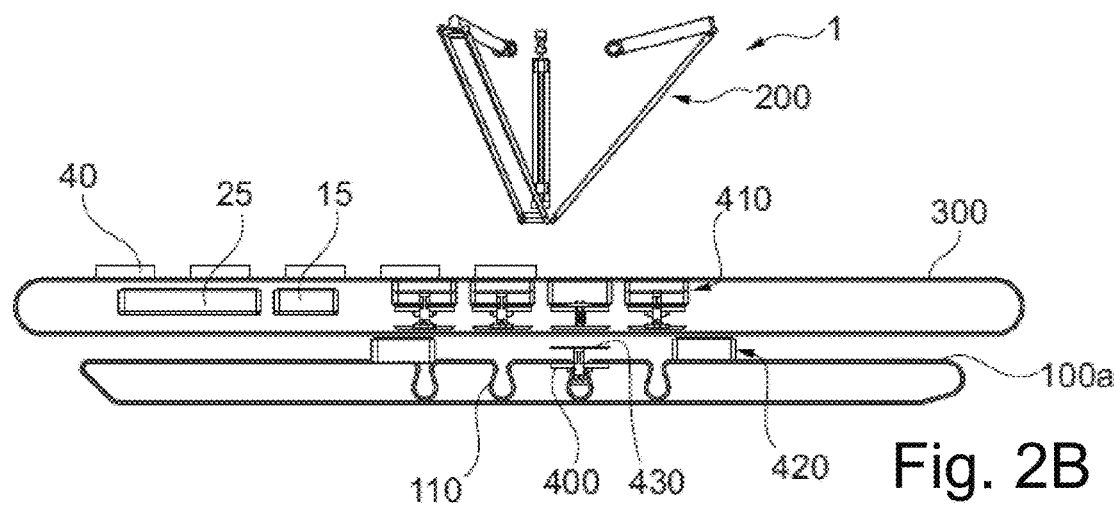
FIG. 2B is a schematic side view of the system of FIG. 2C.
Figure 2C:
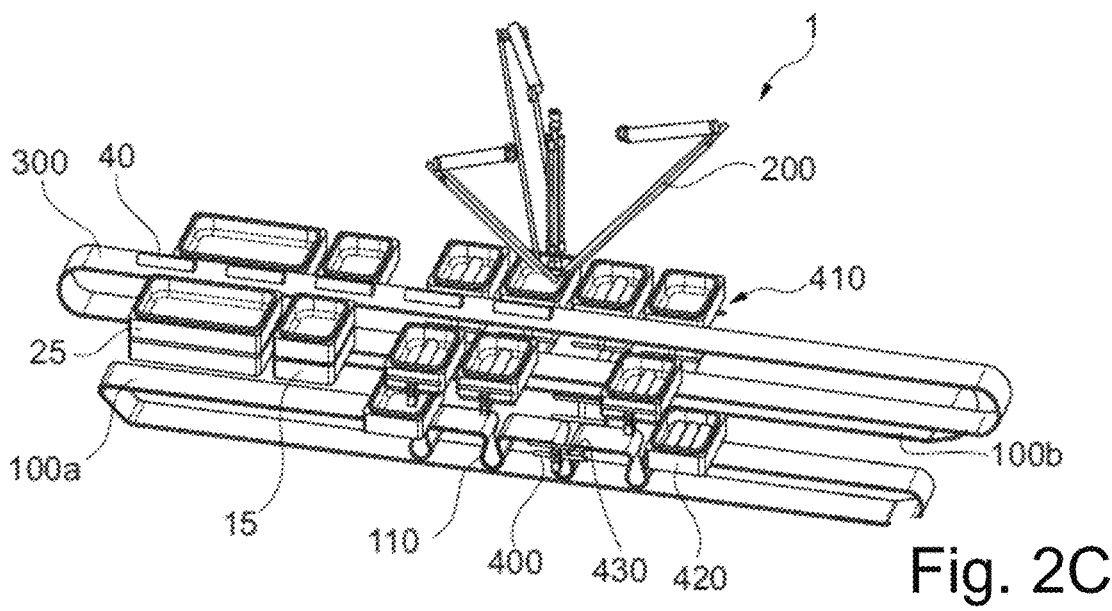
FIG. 2C is an elevated schematic perspective view of the system of FIG. 1B, showing only the container conveyor belts, the item conveyor belt and one of the robotic picker arms.

In one embodiment, the conveyor system transporting the containers comprises at least two conveyor belts 100a, b, for containers 15, 25. As shown in FIG. 2C as an example, the two conveyor belts 100a, b are arranged on opposite sides of the food item conveyor belt 300 and run parallel to the conveying direction of the food items 40.

In all embodiments, the containers 15, 25 may have lengths chosen from one modular length, two modular lengths, three modular lengths and so on. The length is the dimension seen along the direction of transport on the container conveyor belt 100, 100a, 100b. The one modular length container is arranged to cooperate with one handling device, the two modular length container is arranged to cooperate with two handling devices simultaneously and the three modular length container is arranged to cooperate with three handling devices simultaneously.

Figure 2D:
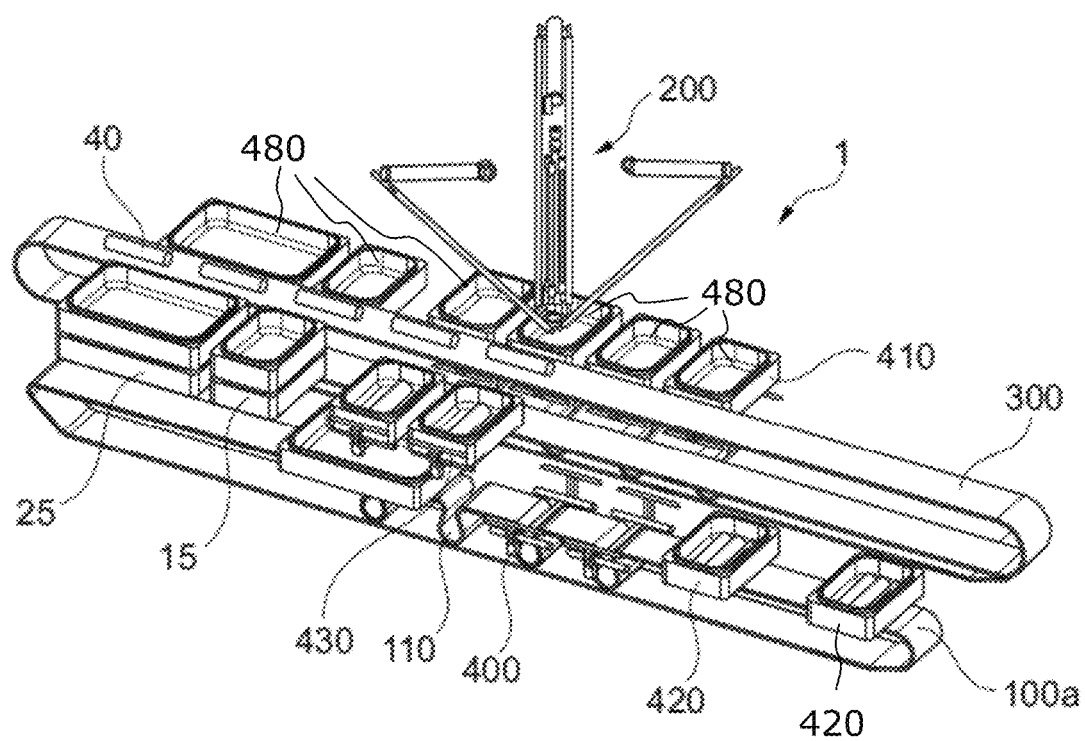
FIG. 2D is an elevated schematic perspective view of the system of FIG. 2C, in a different situation regarding container location.
Figure 2E:
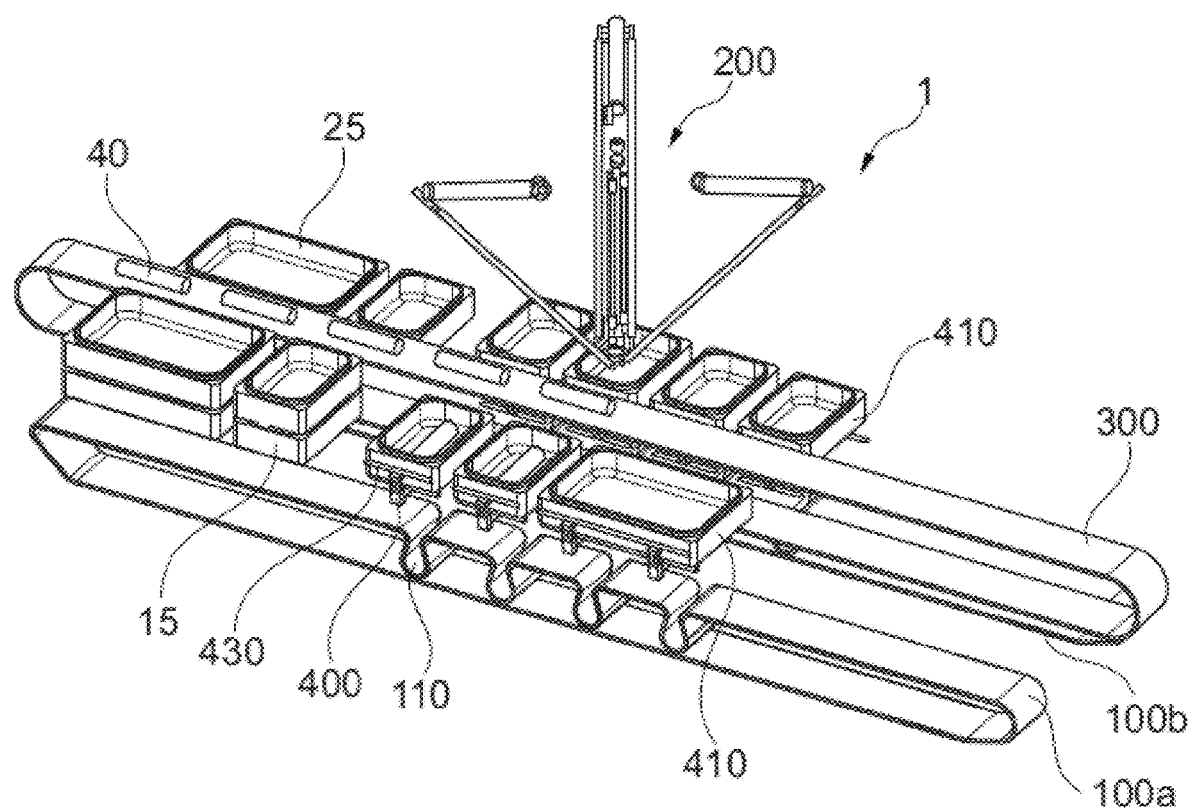
FIG. 2E is an elevated schematic perspective view of the system of FIG. 2C, showing the manipulation of a larger container.
Figure 3A:
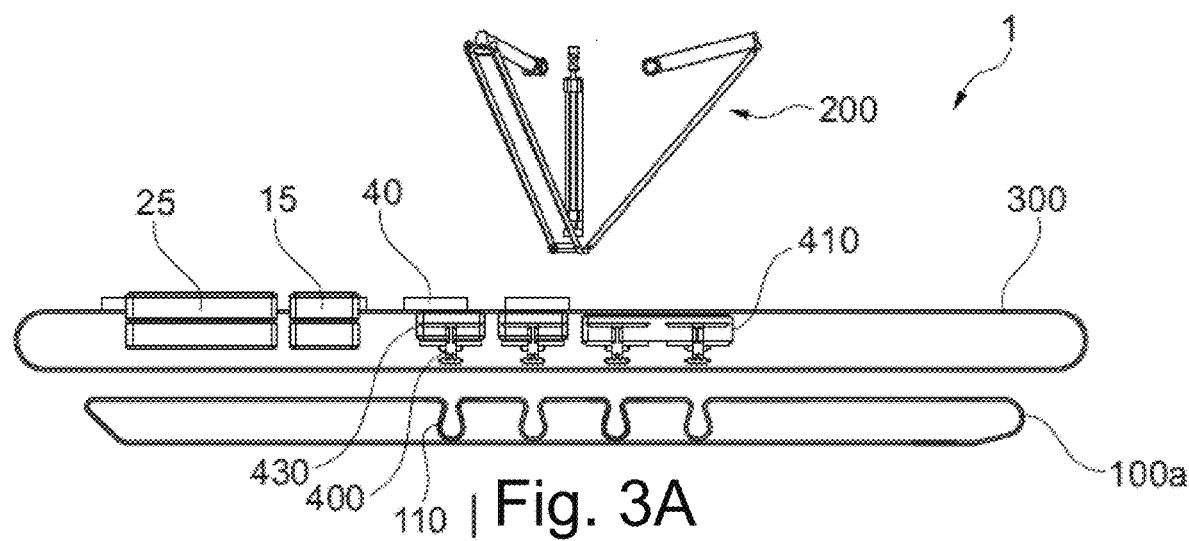
FIG. 3A is a schematic side view of the system of FIG. 3E, showing a large container being held in the food processing position by two selected handling devices.
Figure 3B:
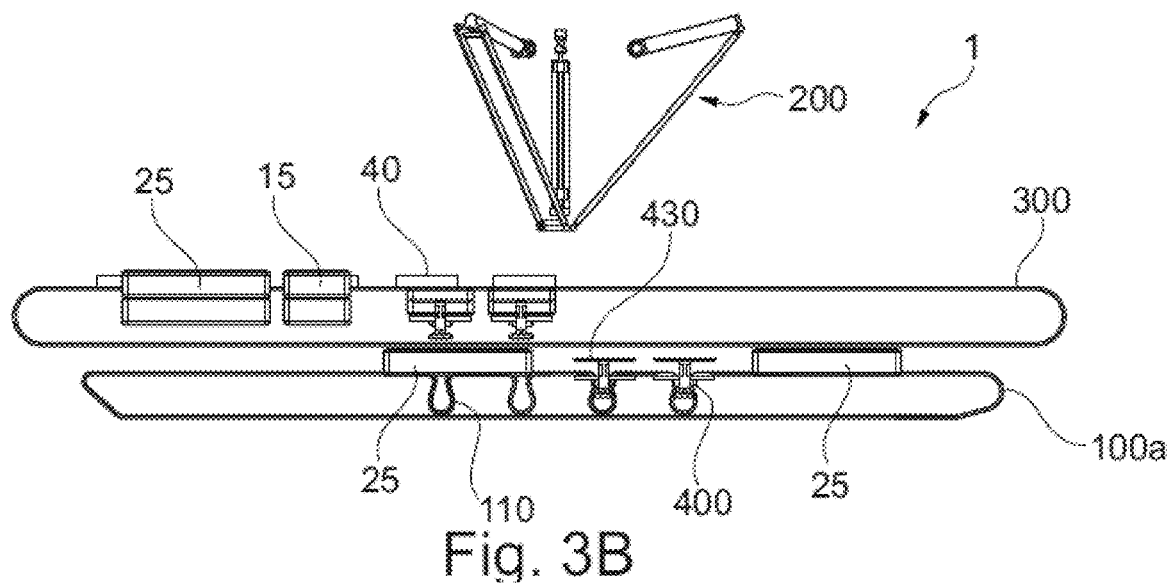
FIG. 3B is a schematic side view of the system of FIG. 3E, showing large containers being transported on the container conveyor.
Figure 3C:
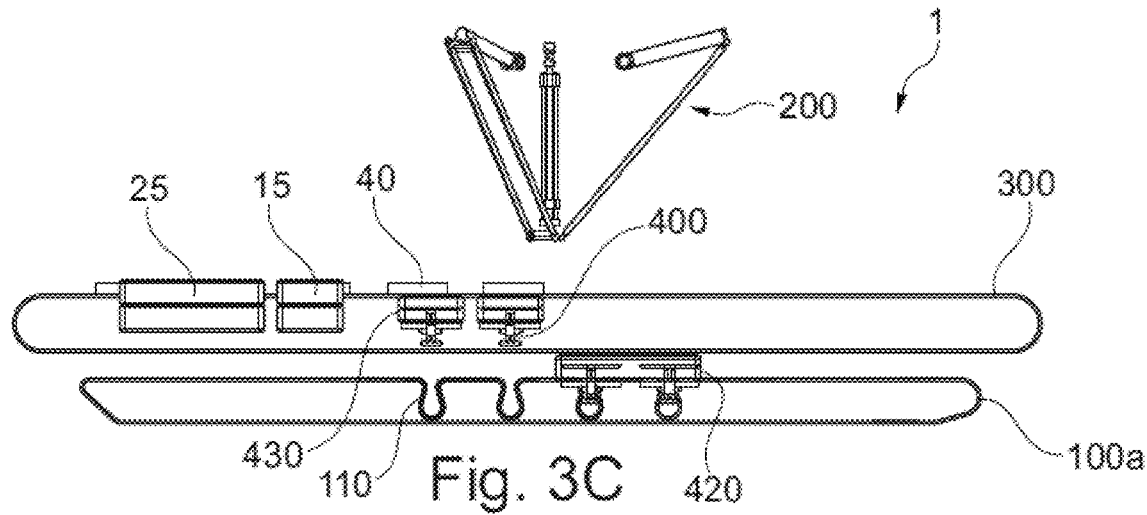
FIG. 3C is a schematic side view of the system of FIG. 3E, showing a large container on the container conveyor being gripped by two selected handling devices.
Figure 3D:
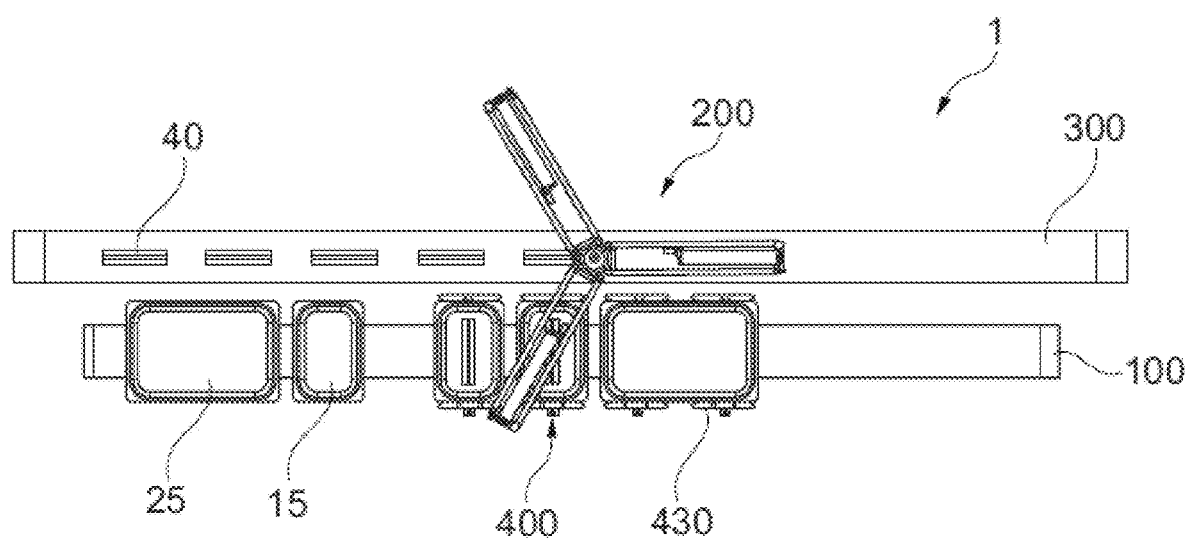
FIG. 3D is a schematic top view of the system of FIG. 3A and only one container conveyor belt is used.
Figure 3E:
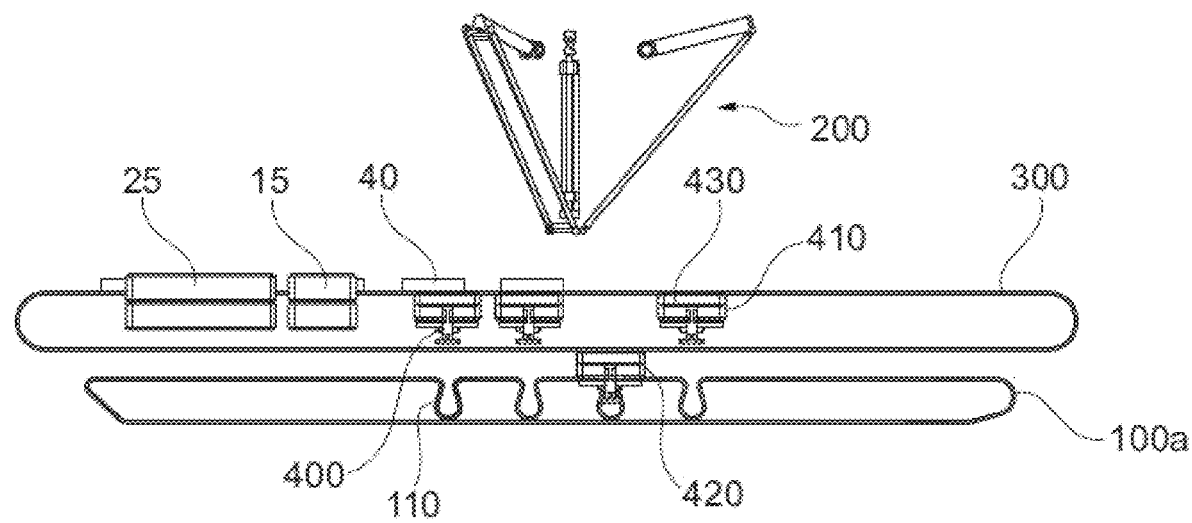
FIG. 3E is a schematic side view of the system of FIG. 3H.
Figure 3F:
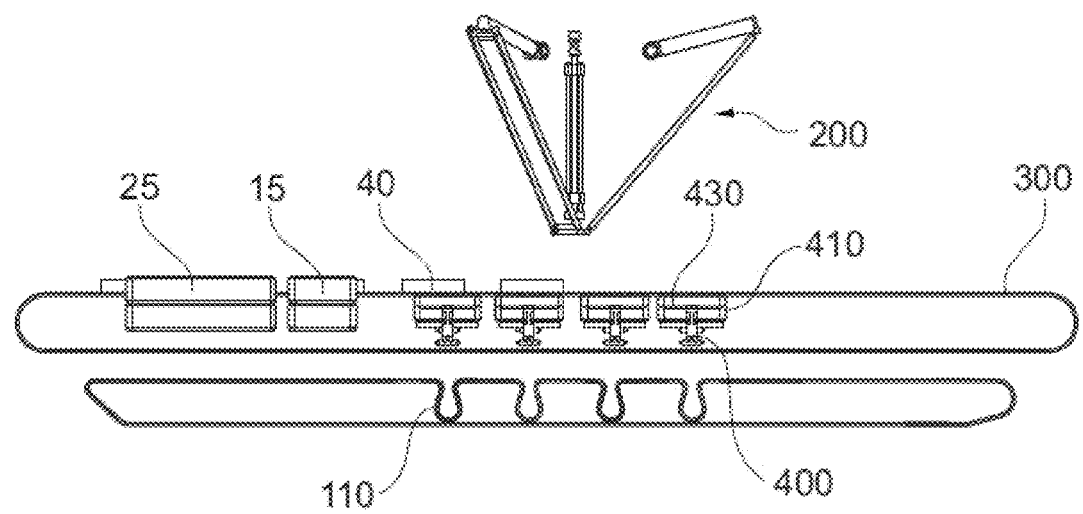
FIG. 3F is a schematic side view of the system of FIG. 3H.
Figure 3G:
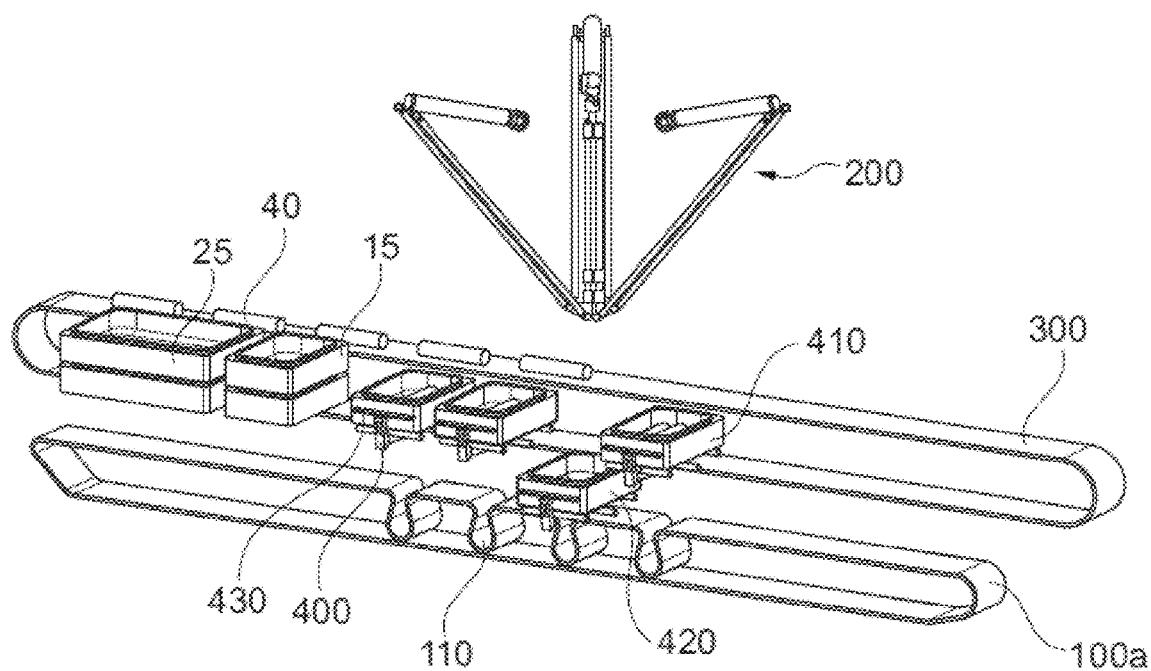
FIG. 3G is an elevated schematic perspective view of the system of FIG. 1B, showing only one container conveyor belt, the item conveyor belt and one of the robotic picker arms, where one container is being moved towards its food processing position.
Figure 3H:
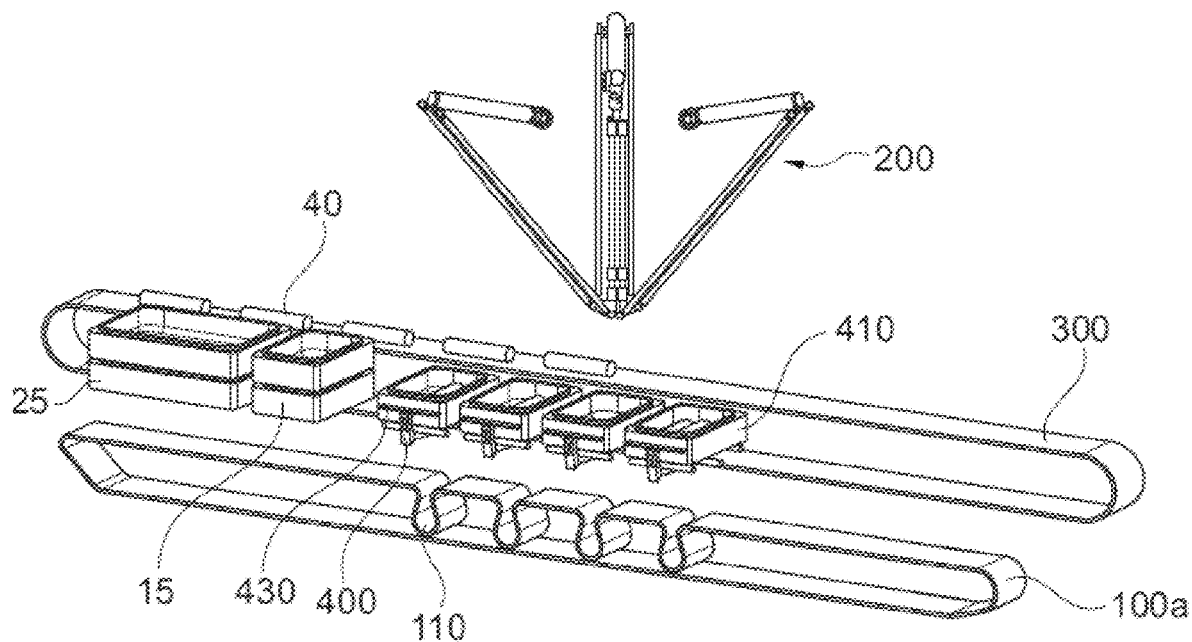
FIG. 3H is an elevated schematic perspective view of the system of FIG. 3G, where the one container from FIG. 3G is in its food processing position and only one container conveyor belt is used.

FIG. 2D illustrates a perspective view of the system of FIG. 2C, in a situation where containers 480 are raised by the gripper devices 430 to the elevated position referred to herein as food processing position 410. The illustration shows that the containers 420 which are not raised to the food processing position 410 are free to pass under the raised containers. FIG. 2D further illustrates that the robotic picking arm 200, which in this embodiment forms the food processing system, can place food items into the containers while the containers are retained in the food processing position 410. When it is identified that the criterion is fulfilled, the handling device is instructed to lower the raised containers back to the container belt 100a, 100b, and these containers may then pass under the containers which are still retained in the food processing position 410.

Figure 4A:
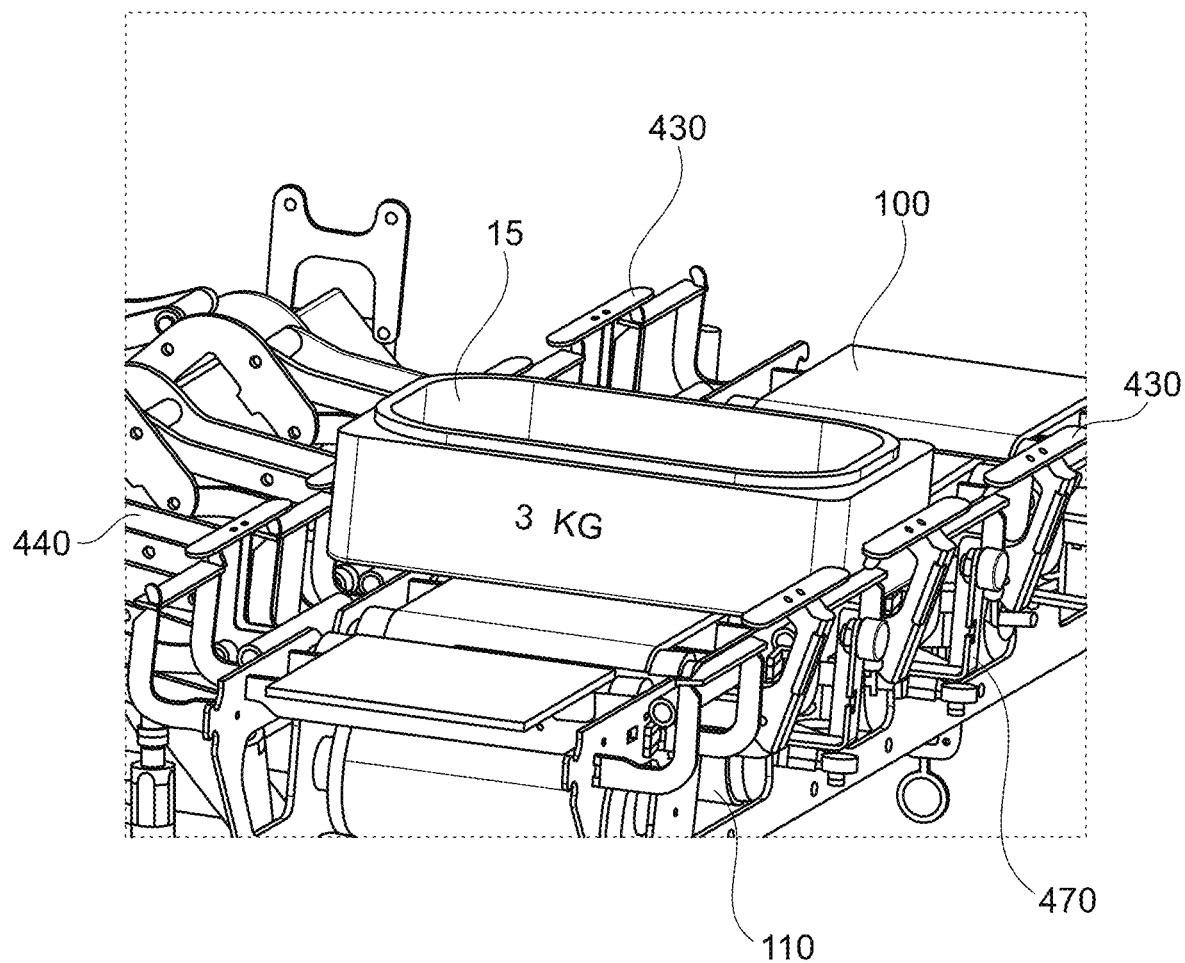
FIG. 4A is an elevated schematic perspective view of a container being transported on the container conveyor to a position adjacent one handling device.
Figure 4B:
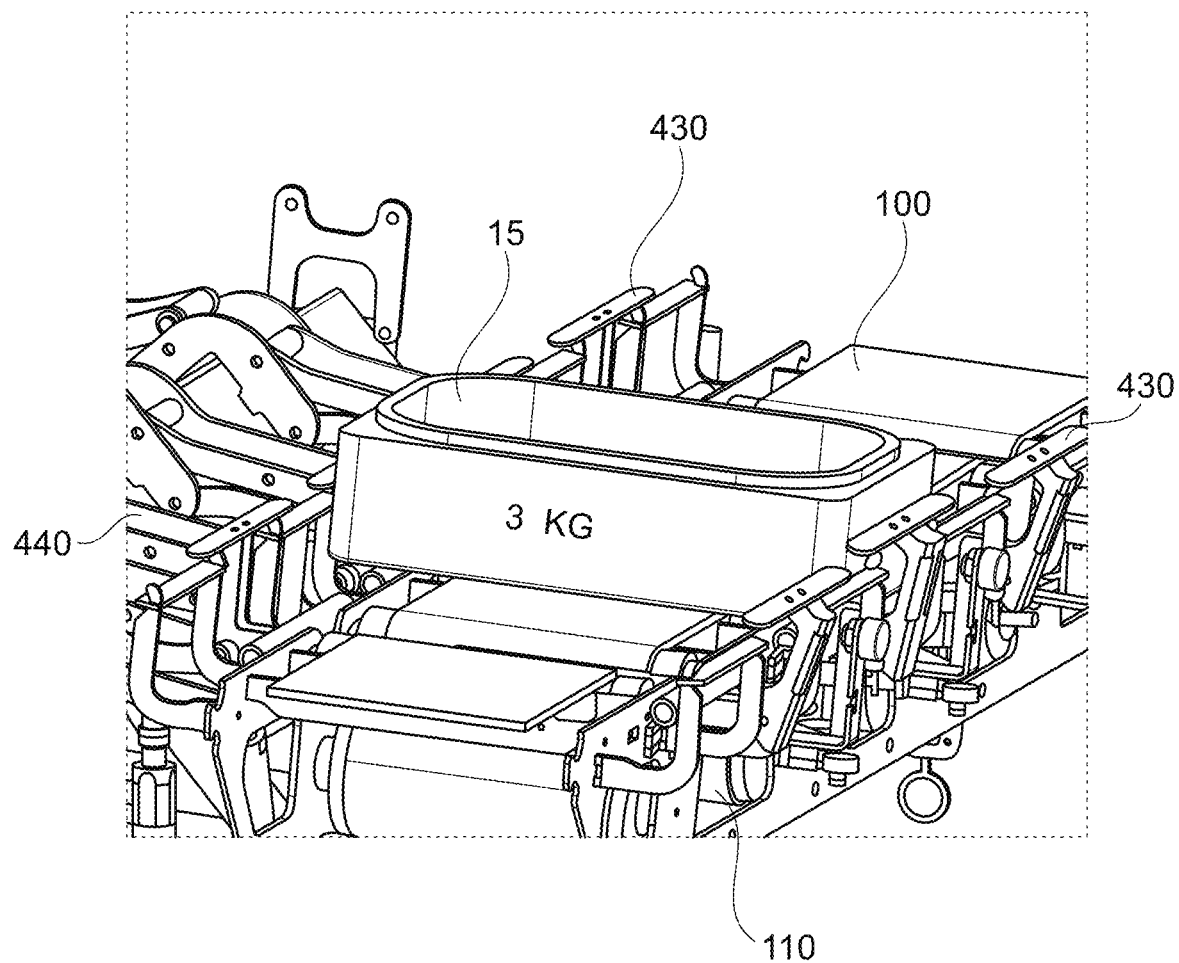
FIG. 4B is an elevated schematic perspective view of a container being gripped on the container conveyor by one handling device.
Figure 4C:
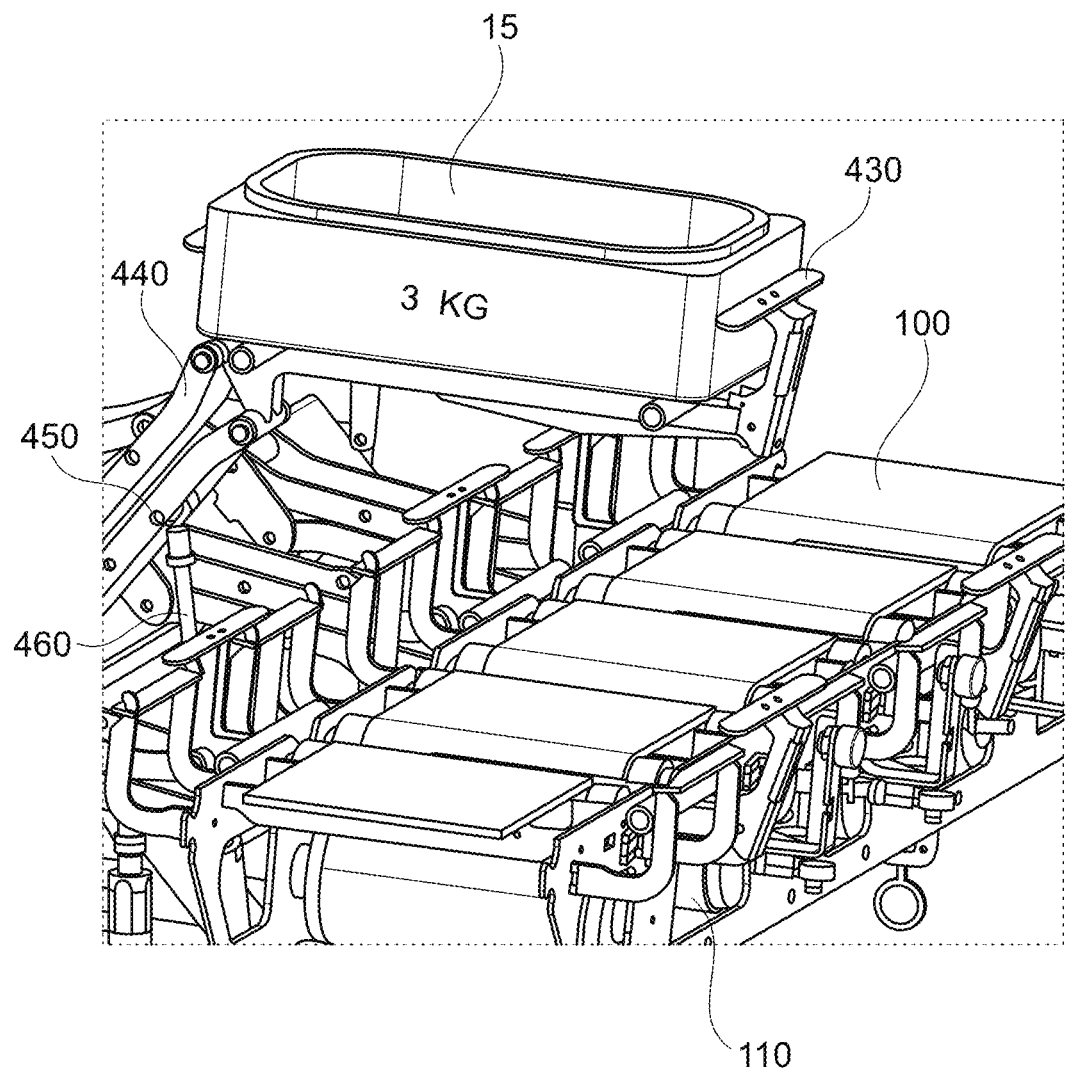
FIG. 4C is an elevated schematic perspective view of a container being held in the food processing position by one handling device.

In one embodiment, shown in FIGS. 4A to 4C, the opposingly arranged gripper devices 430 are attached to a movable arm 440, the movable arm being selectively movable between a first position (see FIG. 4A) and a second position (see FIG. 4C). FIG. 4B shows an intermediate position of the movable arm 440 and thus the container 15. The first position is a passive position where the opposingly arranged gripper devices 430 are in a passive position without contact with a selected container 15 on the container conveyor belt 100, and the second position being an active position where the opposingly arranged gripper devices 430 have engaged with the selected container and moved the container to the food processing position 410 (see FIG. 2E, for example). A brake arm or brake tip 470 may be used to stop the progress of the container on the container conveyor before the gripper devices are deployed to grip the selected container. The movable arm 440 is pivotable about a rotation axis 450, for example using a rotating drive or a linear actuator 460. The movable arm 440 is further reciprocally movable, linearly, between the first and second positions, for example using a linear actuator 460.

In one embodiment, the food items 40 are scanned using a scanning device (not shown) to determine at least one food item property: position on the at least one food item, dimensions, colour, surface topography, weight and combinations thereof. The scanning device may be at least one of a scanner using electromagnetic waves, a weighing scale, sound waves, and combinations thereof.

In one embodiment, a method for placing multiple food items 40 into containers 15, 25 by a food processing system 200, 200a, 200b such that the containers fulfil at least one criterion, has the following steps:

transporting containers 15, 25, using a container conveyor belt 100, 100a, 100b, to transport containers from a container input 10, 10*a*, 10*b*, 20, 20*a*, 20*b* on the container conveyor belt to a container output 30 (see FIG. 1B) on the container conveyor belt, obtaining position data, using the position tracker (not shown), indicative of at least partly tracking positions of containers resting on the container conveyor belt, and controlling the entire system 1 using a control unit (not shown) connected to the position tracker (not shown) for controlling the at least two container handling device 400 using position data from the position tracker, the controlling including:

instructing an available handling device selected from the at least two handling devices to temporarily move a selected container 15, 25 from the container conveyor system 100, 100*a*, 100*b* and moving the container to a food processing position 410 where the container is retained while the food processing system 200, 200*a*, 200*b* places at least one food item 40 into the container, the food processing position being selected such that it allows remaining containers resting on the container conveyor belt to be conveyed past the first and the at least one second position, identifying, after the at least one criterion is fulfilled, available free space on the container conveyor belt for the selected container, and instructing the handling device to place the selected container into the available space on the container conveyor belt.

LIST OF EMBODIMENTS

1. A system for placing multiple of food items into containers by a food processing system such that the containers fulfil at least one criterion, comprising:
   a conveyor system comprising a conveyor belt arranged to transport containers from a container input on the conveyor belt to a container output on the conveyor belt,
   at least two handling devices arranged along the conveyor system at a first and at least one second location,
   a position tracker for obtaining position data indicative of at least partly tracking positions of containers resting on the conveyor belt while being conveyed by the conveyor system, and
   a control unit connected to the position tracker for controlling the at least two handling devices using position data from the position tracker, the controlling including:
   instructing an available handling device selected from the at least two handling devices to temporarily move a selected container from the conveyor system and move the container to a food processing position where the container is retained while the food processing system places at least one food item into the container, the food processing position being selected such that it allows remaining containers resting on the conveyor belt to be conveyed by the conveyor system past the first and the at least one second position, identifying, after the at least one criterion is fulfilled, available free space on the conveyor belt for the selected container, and
   instructing the handling device to place the selected container into the available space on the conveyor belt.

2. The system according to embodiment 1, wherein the containers (15, 25) have a height, a width and a length, where the at least two handling devices (400) are arranged to grab at least a bottom and/or two sides of the selected containers and at least partly move the selected container upwards from the conveyor belt (100, 100*a*, 100*b*), where the food processing position is at a height position exceeding the height of the containers so as to allow remaining containers on the conveyor system to be conveyed under the selected and retained container while the food processing system places multiple of food items into the selected and retained container 3. The system according to embodiment 2, wherein each of the at least two handling devices comprises opposingly arranged gripper devices (430) arranged across the conveyor apparatus.

4. The system according to any preceding embodiment, wherein the at least two handling devices (400) are arranged to move the selected container sideways from the conveyor belt, where the food processing position is at a sideways position exceeding the width of the containers (15, 25) so as to allow remaining containers on the conveyor system to be conveyed past the selected and retained container while the food processing system places multiple of food items into the selected and retained container.

5. The system according to embodiment 4, wherein each of the at least two handling devices (400) comprises opposingly arranged gripper devices (430) arranged to reciprocally grip and slide the selected container sideways from the conveyor belt.

6. The system according to any preceding embodiment, wherein the at least two handling devices (400) are arranged to grip and move the selected container sideways and upwards from the conveyor belt (100, 100*a*, 100*b*), where the food processing position is at a sideways and elevated position exceeding the width and/or the height of the containers so as to allow remaining containers on the conveyor system to be conveyed past and below the selected and retained container while the food processing system places multiple of food items into the selected and retained container.

7. The system according to embodiment 6, wherein each of the at least two handling devices comprises opposingly arranged gripper devices arranged to reciprocally grip and lift and move the selected container sideways and upwards from the conveyor belt.

8. The system according to embodiment 1, wherein the at least two handling devices are arranged to grab a bottom side of the selected containers and at least partly move the selected container upwards from the conveyor belt, where the food processing position is at a height position exceeding the height of the containers so as to allow remaining containers on the conveyor system to be conveyed under the selected and retained container while the food processing system places multiple of food items into the selected and retained container.

9. The system according to any preceding embodiments, wherein the food processing system comprises at least one robotic picker arm arranged to move food items from at least one food item transport conveyor to the selected and retained container.

10. The system according to any preceding embodiment, wherein the conveyor system comprises at least two conveyor belts (100, 100*a*, 100*b*) for containers.

11. The system according to any of the embodiments 3 to 10, wherein the opposingly arranged gripper devices (430) are attached to a movable arm (440), the movable arm (440) being selectively movable between a first position and a second position, the first position being a passive position where the opposingly arranged gripper devices (430) are in a passive position without a contact with a selected container on the conveyor belt (100, 100*a*, 100*b*), and the second position being an active position where the selected container where the opposingly arrange gripper devices have engaged with the container and moved it to the food processing position.

12. The system according to embodiment 11, wherein the movable arm (440) is pivotable about a rotation axis, for example using a rotating drive or a linear actuator.

13. The system according to embodiment 11, wherein the movable arm (440) is reciprocally linearly movable between the first and second positions, for example using a linear actuator (460).

14. The system according to any preceding embodiments, wherein the food processing system comprises a robotic picker arm for picking food items from at least one item conveyor.

15. The system according to any preceding embodiments, configured to scan food items using a scanning device to determine at least one food item property selected from the group of: position on the at least one item conveyor, dimensions, colour, surface topography, weight and combinations thereof.

16. The system according to embodiment 15, wherein the scanning device is selected from the group of: at least one of a scanner using electromagnetic waves, a weigh scale, and combinations thereof.

17. The system according to any of the preceding embodiments, wherein the at least two handling devices are configured for at least partly simultaneous operation such that the time period where the containers selected by the at least two handling devices are retained in the food processing position at least partly overlaps.

18. The system according to embodiment 17, wherein the control unit is configured for controlling the at least partly simultaneous operation of the at least two handling devices such that the step of identifying, after the at least one criterion is fulfilled, available free space on the conveyor belt for the at least two selected containers, and the step of instructing each of the at least two handling device to place the selected containers into the available space on the conveyor belt, takes place for at least two selected containers simultaneously or consecutively.

19. The system according to embodiment 17 or 18, wherein the at least two selected containers differ at least in one or more of: height, width and/or length.

20. The system according to any of the preceding embodiments, wherein the at least two handling devices are configured for moving the selected containers from the conveyor system to the food processing position while the selected container or other containers on the conveyor system are moving on the conveyor system.

21. The system according to any preceding embodiment, wherein the containers have lengths chosen from one modular length, two modular lengths and three modular lengths.

22. The system according to embodiment 21, wherein the one modular length container is arranged to cooperate with one handling device, the two modular length container is arranged to cooperate with two handling devices simultaneously and the three modular length container is arranged to cooperate with three handling devices simultaneously.

23. A method for operating a system (1) for placing multiple of food items into containers by a food processing system such that the containers fulfil at least one criterion, comprising:

transporting containers, using a conveyor system comprising a conveyor belt arranged to transport containers, from a container input on the conveyor belt to a container output on the conveyor belt, handling the containers by use of at least two handling devices arranged along the conveyor system at a first and at least one second location, obtaining position data, using a position tracker, indicative of at least partly tracking positions of containers resting on the conveyor belt while being conveyed by the conveyor system, and controlling the system (1) using a control unit connected to the position tracker for controlling the at least two handling devices using position data from the position tracker, characterised in that the controlling includes:

instructing an available handling device selected from the at least two handling devices to temporarily move a selected container from the conveyor system and move the container to a food processing position where the container is retained while the food processing system places at least one food item into the container, the food processing position being selected such that it allows remaining containers resting on the conveyor belt to be conveyed by the conveyor system past the first and the at least one second position, identifying, after the at least one criterion is fulfilled, available free space on the conveyor belt for the selected container, and instructing the handling device to place the selected container into the available space on the conveyor belt.

24. The method according to embodiment 23, wherein each of the containers have a height, a width and a length, wherein the step of moving the container by the at least two handling devices is performed by the steps of:

grabbing a bottom and/or at least two sides of the selected containers, at least partly moving the selected container upwards from the conveyor belt, where the food processing position is at a height position exceeding the height of the containers for allowing remaining containers on the conveyor system to be conveyed under the selected and retained container while the food processing system places multiple of food items into the selected and retained container.

25. The method according to embodiment 23 or 24, wherein the at least one criterion comprises, a weight target,
a number target,
a geometrical or volume target,
a color target,
a number of species target,
a combination of one or more of the above.

26. The method according to any of the embodiments 23 to 25 wherein the step of at least partly tracking positions of containers resting on the conveyor belt while being conveyed by the conveyor system using a position tracker further comprises tracking the containers after the at least one criterion has been reached and the containers have been placed into the available space on the conveyor belt.

27. The method according to any of the embodiments 23 to 26, wherein the containers have two or more different geometrical shapes/volumes.

28. The method according to embodiment 27, wherein the at least one criterion comprises at least two criteria assigned to two or more different containers such one or more of the following applies:

containers of same geometrical shapes/volumes have different at least one criterion, containers of different geometrical shapes/volumes have different at least one criterion wherein the step of at least partly tracking positions of containers resting on the conveyor belt while being conveyed by the conveyor system using a position tracker further comprises tracking the two or more different containers after the different at least one criterion has been reached and the containers have been placed into the available space on the conveyor belt.

29. The method according to any of embodiments 23 to 28, wherein the step of moving the container by the at least two handling devices is performed by moving the selected container sideways from the conveyor belt, where the food processing position is at a sideways position exceeding the width of the containers so as to allow remaining containers on the conveyor system to be conveyed next to the selected and retained container while the food processing system places multiple of food items into the selected and retained container.

30. The method according to any of embodiments 23 to 29, wherein the step of moving the container by the at least two handling devices is performed by gripping and pushing the selected container sideways and upwards from the conveyor belt, where the food processing position is at a sideways and elevated position exceeding the width and the height of the containers so as to allow remaining containers on the conveyor system to be conveyed next to and below the selected and retained container while the food processing system places multiple of food items into the selected and retained container.

31. The method according to embodiment 30, wherein each of the at least two handling devices comprises opposingly arranged gripper devices arranged to reciprocally grip and lift and slide the selected container sideways and upwards from the conveyor belt.

32. The method according to any of embodiments 23 to 30, wherein the step of moving the container by the at least two handling devices is performed by grabbing a bottom side of the selected containers and at least partly moving the selected container upwards from the conveyor belt, where the food processing position is at a height position exceeding the height of the containers so as to allow remaining containers on the conveyor system to be conveyed under the selected and retained container while the food processing system places multiple of food items into the selected and retained container.

33. The method according to any of embodiments 23 to 32, wherein the method further comprises the step of moving food items using at least one robotic picker arm of the food processing system, the arm being arranged to move items from at least one item transport conveyor to the selected and retained container.

34. The method according to any of embodiments 23 to 33, wherein the conveyor system comprises at least two conveyor belts for containers.

35. The method according to any of embodiments 23 to 34, wherein the containers have lengths chosen from one modular length, two modular lengths and three modular lengths.

36. The method according to embodiment 35, wherein the one modular length container is arranged to cooperate with one handling device, the two modular length container is arranged to cooperate with two handling devices simultaneously and the three modular length container is arranged to cooperate with three handling devices simultaneously.

37. The method according to any of embodiments 23 to 36, wherein the step of moving a selected container by the at least two handling devices is performed by each of the at least two handling devices being attached to a movable arm, the movable arm being selectively movable between a first position and a second position, wherein in the first position a selected container rests on the conveyor belt and in the second position the selected container is removed off the transport belt such that containers on the transport belt are freely transportable on the conveyor belt.

38. The method according to embodiment 37, wherein the movable arm is pivotable about a rotation axis, for example using an rotating drive or a linear actuator.

39. The method according to embodiments 37 or 38, wherein the movable arm is reciprocally linearly movable between the first and second positions, for example using a linear actuator.

40. The method according to any of embodiments 23 to 39, wherein the at least one robotic picker arm picks food items from at least one item conveyor.

41. The method according to any of embodiments 23 to 40, wherein the method further comprises the step of scanning the food items using a scanning device to determine at least one food item property selected from the group consisting of position on the at least one item conveyor, dimensions, colour, surface topography, weight and combinations thereof.

42. The method according to embodiment 41, wherein the scanning device is selected from the group consisting of at least one of a scanner using electromagnetic waves, a weigh scale, and combinations thereof.

43. The method according to any of embodiments 23-42, wherein the at least two handling devices are operated simultaneously.

44. The method according to embodiment 43, wherein the simultaneous operation of the at least two handling devices is controlled such that the step of identifying, after the at least one criterion is fulfilled, available free space on the conveyor belt for the selected container, and the step of instructing the handling device to place the selected container into the available space on the conveyor belt, takes place for two containers simultaneously.

45. The method according to embodiment 43 or 44, wherein the at least two handling devices and the control unit is operated and controlled simultaneously for at least two containers having different size or shape.

46. The method according to any of the preceding embodiments, wherein the at least two handling devices are operated to move the selected container from the conveyor system to the food processing position while the selected container or other containers on the conveyor system are moving on the conveyor system.

While the invention has been illustrated and described in detail in the drawings and foregoing description, such illustrations and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A batching system for placing food items into containers such that the containers fulfil at least one criterion based on a target weight of the food items placed into the containers, the system comprising:

a food processing system arranged for placing food items into the containers, a conveyor system comprising a conveyor belt arranged to transport containers from a container input on the conveyor belt to a container output on the conveyor belt, at least two handling devices arranged along the conveyor system at a first and at least one second location, a position tracker for obtaining position data indicative of at least partly tracking positions of containers resting on the conveyor belt while being conveyed by the conveyor system, and a control unit connected to the position tracker for controlling the at least two handling devices using position data from the position tracker, wherein the controlling includes:

instructing an available handling device selected from the at least two handling devices to temporarily move a selected container from the conveyor system and move the container to a food processing position where the container is retained while the food processing system places at least one food item into the container, the food processing position being selected such that it allows remaining containers resting on the conveyor belt to be conveyed by the conveyor system past the first and the at least one second position, identifying, after the at least one criterion based on the target weight is fulfilled, an available free space on the conveyor belt for the selected container, and instructing the handling device to place the selected container into the available free space on the conveyor belt;

wherein the at least two handling devices are configured for at least partly simultaneous operation such that a time period where the containers selected by the at least two handling devices are retained in the food processing position at least partly overlaps;

wherein the control unit is configured for controlling the at least partly simultaneous operation of the at least two handling devices such that the step of identifying, after the at least one criterion based on the target weight is fulfilled, available free space on the conveyor belt for at least two selected containers, and the step of instructing each of the at least two handling device to place the at least two selected containers into the available free space on the conveyor belt, takes place for the at least two selected containers simultaneously;

wherein each of the at least two handling devices comprises gripper devices situated on opposite sides of the conveyor and facing sideways to a container transport direction, wherein the gripper devices are arranged to reciprocally grip containers from opposing sides of the conveyor belt.

2. The system according to claim 1, wherein the food processing system comprises at least one robotic picker arm arranged to move food items from at least one food item transport conveyor to the selected and retained container.

3. The system according to claim 2, comprising a plurality of cells, each cell having an associated one of the at least one robotic picker arms and a dedicated group of the at least two handling devices.

4. The system according to claim 3, wherein each cell is configured for placing the food items into containers having different sizes.

5. The system according to claim 1, wherein the conveyor system comprises at least two conveyor belts for containers.

6. The system according to claim 1, wherein the containers have a height, a width and a length, where the at least two handling devices are arranged to grab at least a bottom and/or two sides of the selected containers and at least partly move the selected container upwards from the conveyor belt, where the food processing position is at a height position exceeding the height of the containers so as to allow remaining containers on the conveyor system to be conveyed under the selected and retained container while the food processing system places the food items into the selected and retained container.

7. The system according to claim 1, wherein the gripper devices are attached to a movable arm, the movable arm being selectively movable between a first position and a second position, the first position being a passive position where the gripper devices are in a passive position without a contact with a selected container on the conveyor belt, and the second position being an active position where the gripper devices have engaged with the container and moved it to the food processing position.

8. The system according to claim 1, further comprising a scanning device for scanning the food items to determine at least one food item property selected from a group of:

position on a food item transport conveyor, dimensions, color, surface topography, weight, and combinations thereof.

9. The system according to claim 1, wherein the at least two selected containers differ at least in one or more of: height, width and/or length.

10. The system according to claim 1, wherein the at least two handling devices are configured for moving the selected containers from the conveyor system to the food processing position while the selected container or other containers on the conveyor system are moving on the conveyor system.

11. The system according to claim 1, wherein the controlling further includes accumulating containers from different customer orders together into the available free space on the conveyor belt.

12. A method for operating a batching system for placing food items into containers by a food processing system such that the containers fulfil at least one criterion based on a target weight of the food items placed into the containers, the method comprising:

transporting containers, using a conveyor system comprising a conveyor belt arranged to transport containers, from a container input on the conveyor belt to a container output on the conveyor belt, handling the containers by use of at least two handling devices arranged along the conveyor system at a first and at least one second location, obtaining position data, using a position tracker, indicative of at least partly tracking positions of containers resting on the conveyor belt while being conveyed by the conveyor system, and controlling the system using a control unit connected to the position tracker for controlling the at least two handling devices using position data from the position tracker, wherein the controlling includes:

instructing an available handling device selected from the at least two handling devices to temporarily move a selected container from the conveyor system and move the container to a food processing position where the container is retained while the food processing system places at least one food item into the container, the food processing position being selected such that it allows remaining containers resting on the conveyor belt to be conveyed by the conveyor system past a first and at least a second position, identifying, after the at least one criterion based on the target weight is fulfilled, available free space on the conveyor belt for the selected container, and instructing the handling device to place the selected container into an available free space on the conveyor belt;

wherein the at least two handling devices are configured for at least partly simultaneous operation such that a time period where the containers selected by the at least two handling devices are retained in the food processing position at least partly overlaps;

wherein the control unit is configured for controlling the at least partly simultaneous operation of the at least two handling devices such that the step of identifying, after the at least one criterion based on the target weight is fulfilled, available free space on the conveyor belt for at least two selected containers, and the step of instructing each of the at least two handling device to place the at least two selected containers into the available free space on the conveyor belt, takes place for the at least two selected containers simultaneously;

wherein each of the at least two handling devices comprises gripper devices situated on opposite sides of the conveyor and facing sideways to a container transport direction, wherein the gripper devices are arranged to reciprocally grip containers from opposing sides of the conveyor belt.

13. The method according to claim 12, wherein the at least one criterion is further based on at least two different criteria assigned to two or more different containers such one or more of the following applies:

containers of same geometrical shapes/volumes have a different criterion of target weight, containers of different geometrical shapes/volumes have a different criterion of target weight, wherein the step of at least partly tracking positions of containers resting on the conveyor belt while being conveyed by the conveyor system using a position tracker further comprises tracking the two or more different containers after the different at least one criterion has been reached and the containers have been placed into an available space on the conveyor belt.

14. The method according to claim 12, further comprising a brake arm arranged to stop progress of the selected container along the conveyor belt before the gripper devices are deployed to reciprocally grip and slide the selected container sideways from the conveyor belt.

* * * * *